United States Patent [19]

Preston et al.

[11] 4,357,859
[45] Nov. 9, 1982

[54] PRESSURE SENSOR

[75] Inventors: Donald Preston, Agawam, Mass.; Robert G. Yeaton, East Granby, Conn.

[73] Assignee: United Technologies Corporation, Hartford, Conn.

[21] Appl. No.: 252,505

[22] Filed: Apr. 8, 1981

[51] Int. Cl.³ ............................ F01B 19/04; F16J 3/04
[52] U.S. Cl. ........................................................ 92/41
[58] Field of Search ...................... 92/41, 44, 153, 155, 92/171, 143; 73/707, 729, 430

[56] References Cited

U.S. PATENT DOCUMENTS

| | | | |
|---|---|---|---|
| 2,191,861 | 2/1940 | Rymal | 92/153 |
| 2,376,711 | 5/1945 | Mock | 92/41 |
| 2,827,077 | 1/1956 | Mitchell | 92/41 |
| 3,545,339 | 12/1970 | Sickmeier | 92/41 |
| 3,590,693 | 7/1971 | Rasko | 92/100 |
| 3,969,989 | 7/1976 | Maurer | 92/85 R |

FOREIGN PATENT DOCUMENTS

| | | | |
|---|---|---|---|
| 540376 | 4/1957 | Canada | 92/44 |
| 1224684 | 9/1966 | Fed. Rep. of Germany | 92/155 |

*Primary Examiner*—Martin P. Schwadron
*Assistant Examiner*—Richard L. Klein
*Attorney, Agent, or Firm*—John Swiatocha

[57] ABSTRACT

Fatigue fractures in the bellows capsule of a bellows-type pressure sensor are prevented by wrapping the capsule with a vibration damping material such as an open cell polyurethane foam saturated with a fluid. In the preferred embodiment, wherein the sensor is employed in a gas turbine engine fuel control, the fluid may conveniently comprise liquid jet engine fuel.

5 Claims, 1 Drawing Figure

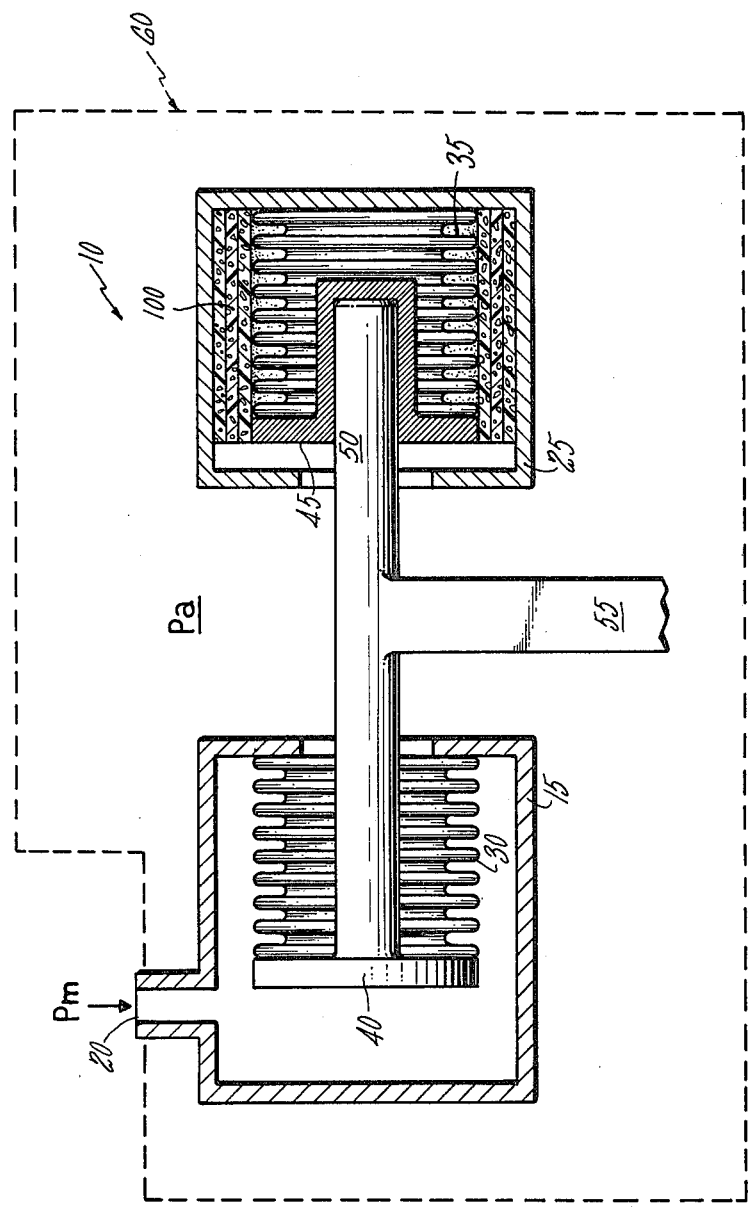

PRESSURE SENSOR

DESCRIPTION

1. Technical Field

This invention relates generally to bellows-type pressure sensors, and more particularly to an improvement in such sensors wherein fatigue cracking due to vibration of the bellows is minimized.

2. Background Art

A well known type of pressure sensor includes one or more bellows capsules which respond by movement thereof to fluid pressure in contact therewith. The bellows may move an indicator or in the alternative, a fluid control device such as a valve or the like to control the sensed pressure.

As indicated in U.S. Pat. No. 3,975,903 to Stearns, fuel controls for gas turbine powerplants often employ such bellows-type pressure sensors. As set forth in this patent, such pressure sensors generally include a "motor" bellows responsive to a sensed pressure such as compressor discharge pressure of the gas turbine engine. This pressure is referenced to an absolute by an evacuated bellows, (having a vacuum therein), ambient pressure acting on the motor bellows being compensated for by the same pressure acting on the evacuated bellows. Inasmuch as such fuel controls are mounted in close proximity to the associated gas turbine engines, it will be appreciated that vibrations of an engine are quite readily transmitted to the fuel control and the pressure sensor therein. It has recently been discovered that those vibrations which are equal in frequency to the natural frequency of the bellows and various harmonics thereof cause fatigue cracking of the bellows and therefore, malfunction of the fuel control and quite possibly the associated gas turbine engine. The evacuated bellows employed in pressure sensors are particularly susceptible to such fatigue cracking due to vibration.

DISCLOSURE OF INVENTION

It is, therefore, among the objects of the present invention to provide an improved bellows-type pressure sensor wherein fatigue cracking due to vibration of the bellows capsule is minimized In accordance with the present invention, fatigue cracking due to vibration of a pressure sensing bellows capsule is minimized by providing a wrapping of vibration damping material saturated with a fluid about the major surface of the capsule. The vibration damping material may comprise any suitable substance such as an open celled polyurethane foam, and the fluid may comprise any convenient liquid or gas depending upon the structure of the bellows capsule and the frequency of natural vibration thereof. The vibration is damped by both a restriction of capsule movement by the vibration damping material itself, and a restriction in the transfer of energy through the fluid due to the partial isolation of fluid pockets within the damping material.

The foregoing, and other features and advantages of the present invention, will become more apparent from the following description and accompanying drawing.

BRIEF DESCRIPTION OF THE DRAWING

The drawing is a partially sectioned view of a preferred embodiment of the pressure sensing bellows of the present invention.

BEST MODE OF CARRYING OUT THE INVENTION

Referring to the drawing, a bellows-type pressure sensor is shown generally at 10, the sensor including a housing 15 having port 20 therein and a housing 25. The housings accommodate bellows capsules 30 and 35 sealed to pistons or headers 40 and 45, respectively. The bellows are connected by rod 50 having a transverse leg 55 which connects for example, to an indicator or a pressure control device such as a control valve or the like. A pressure to be measured $P_m$ such as the discharge pressure of the compressor section of a gas turbine engine, is input to the pressure sensor through port 20, and acts on the outer face of header 40. The opposite (inner) face of header 40 is acted upon by ambient pressure $P_a$ which may be fuel pressure when pressure sensor 10 is employed in a gas turbine engine fuel control 60. The bellows respond to these pressures in the usual manner by producing a longitudinal movement or force proportional to the pressures thereby driving transverse leg 55. To reference the measured pressure to an absolute value, it is necessary to cancel the effect of ambient pressure on the inside of header 40. Such a cancelation is effected by bellows 35 wherein ambient pressure acting on the outer face of header 45 compensates for ambient acting on the inner face of header 40.

As set forth hereinabove, vibration of the bellows capsules at the natural frequency thereof or multiples of this frequency often results in fatigue cracking of the bellows, causing malfunction of any associated apparatus such as a gas turbine engine fuel control if the sensor is so employed. This is particularly true with respect to evacuated bellows 35 which have heretofore exhibited an exaggerated propensity for such fatigue cracking due to vibration.

To minimize the risk of such fatigue cracking, the bellows-type pressure sensor of the present invention includes means for effectively, simply, and economically damping such vibration. Referring again to the drawing, the pressure sensor of the present invention includes a wrapping of vibration damping material 100, which in an incompressed state, substantially fills the radial gap between the associated capsule and the inner surface of the casing. As used herein, "major surface" of the capsule refers to the outer surfaces of the bellows convolutions, it being understood that the damping material does not occupy the spaces between adjacent convolutions and accordingly, does not interfere with movement of the bellows. The damping material comprises any suitable substances which is capable of saturation by a fluid as determined by the structure and natural frequency of the vibration of bellows capsule 35. In modern day gas turbine engine fuel controls wherein the bellows capsule is formed from stainless steel such as Inconel ® 718, and wherein the natural frequency of vibration of the capsule is on the order of 400 cycles per second, vibration damping material 100 comprises a polyurethane foam. In the preferred embodiment, the foam is provided in elongated strip form, of a width equal to the length of the capsule and wrapped repeatedly about the capsule to fill the void between the capsule and the casing wall.

The vibration damping material is saturated with a suitable fluid, preferably, a fluid the pressure of which defines the ambient pressure in the sensor. In the preferred embodiment, where the pressure sensor is employed in a gas turbine engine fuel control, this fluid comprises jet engine fuel which fills the interior of casing 25.

Vibration of bellows capsule 35 is damped by essentially two mechanisms. First, the damping material or foam 100 damps vibration by the interposition of its own mass between the capsule and the inner surface of the casing. Secondly, the open foam cells which accommodate the fluid within the interior of the damping material restrict communication of fluid from one cell to another, thereby minimizing energy transfer within the fluid between cells, thereby further damping vibration. Accordingly, it will be appreciated that vibration is effectively damped in the pressure sensor of the present invention in an economical manner which requires no specialized damping fluid or mechanisms, but rather an inexpensive wrap and a fluid ordinarily accommodated within the sensor casing.

While the present invention has been described in conjunction with an evacuated bellows, it will be understood that it may be employed with equal utility in conjunction with a pressurized bellows with perhaps certain modifications in the composition of the damping material and saturating fluid.

Having thus described the invention, what is claimed is:

1. A pressure sensor comprising a housing, a bellows disposed within said casing and sealed thereto, said bellows being responsive to the pressure of a fluid within said housing to cause displacement of said bellows, said pressure sensor being characterized by a wrapping of vibration damping material disposed about the major surface of said bellows, said wrapping being saturated with said fluid, said saturated wrapping serving to minimize fatigue fractures of said bellows by damping vibration of said bellows at the natural frequency thereof.

2. The pressure sensor of claim 1 further characterized by said wrapping in a generally incompressed state thereof, substantially filling a void between said major surface of said bellows and the inner surface of said housing.

3. The pressure sensor of claim 1 further characterized by said vibration damping material comprising an open cell foam.

4. The pressure sensor of claim 3 wherein said foam comprises polyurethane.

5. The pressure sensor of claim 1 wherein said fluid comprises a liquid fuel for a gas turbine engine.

* * * * *